(12) United States Patent
Chen et al.

(10) Patent No.: US 9,328,498 B2
(45) Date of Patent: May 3, 2016

(54) MOBILE TOILET STRUCTURE

(75) Inventors: Ming-Chiu Chen, Changhua (TW);
Te-Chung Hung, Changhua (TW)

(73) Assignee: Chi Ping Plastic Co. Ltd., Changhua (TW)

( * ) Notice: Subject to any disclaimer, the term of this patent is extended or adjusted under 35 U.S.C. 154(b) by 263 days.

(21) Appl. No.: 14/002,736

(22) PCT Filed: May 31, 2011

(86) PCT No.: PCT/CN2011/074963
§ 371 (c)(1),
(2), (4) Date: Sep. 2, 2013

(87) PCT Pub. No.: WO2012/162881
PCT Pub. Date: Dec. 6, 2012

(65) Prior Publication Data
US 2014/0143945 A1  May 29, 2014

(51) Int. Cl.
| | |
|---|---|
| *E03D 11/00* | (2006.01) |
| *E04B 1/343* | (2006.01) |
| *A47K 11/02* | (2006.01) |
| *E03D 7/00* | (2006.01) |
| *E04H 1/12* | (2006.01) |

(52) U.S. Cl.
CPC ............... *E03D 11/00* (2013.01); *A47K 11/02* (2013.01); *E03D 7/00* (2013.01); *E04B 1/34321* (2013.01); *E04H 1/1216* (2013.01)

(58) Field of Classification Search
CPC ... E04H 1/1216; E04B 1/34321; E03D 11/00; E03D 7/00; A47K 11/00; A47K 11/02; A47K 4/00

USPC ............ 4/321, 476–479, 482, 483, 449, 460, 4/664; 52/34, 35, 36.2, 79.1, 79.12, 79.6, 52/79.9, 143, 264
See application file for complete search history.

(56) References Cited

U.S. PATENT DOCUMENTS

| | | | | |
|---|---|---|---|---|
| 2,364,083 | A * | 12/1944 | Lindsay ................... | B65D 7/32 220/683 |
| 4,065,885 | A * | 1/1978 | Blick, III .............. | E04H 1/1216 4/460 |
| 4,744,111 | A * | 5/1988 | Tegg ...................... | E04H 1/1216 4/460 |
| 8,091,157 | B2 * | 1/2012 | Tyler ...................... | E04H 1/1216 4/477 |
| 2004/0208689 | A1 * | 10/2004 | Dijkstra ................... | B65D 7/24 403/256 |
| 2006/0260214 | A1 * | 11/2006 | Tagg ...................... | E04H 1/1216 52/79.1 |

* cited by examiner

*Primary Examiner* — J. Casimer Jacyna
(74) *Attorney, Agent, or Firm* — Che-Yang Chen; Law Office of Scott Warmuth

(57) ABSTRACT

An improved mobile toilet structure may include a base, four side bars, four sleeve tubes, four panels and a lid. The base has four threaded holes at four corners of the upper side of the base, and a vertical exhaust pipe at one side of the rear portion of the base. The side bar has a first threaded portion on its upper end and a second threaded portion on its lower end. The sleeve tube has an opening on one side and the two margins of the opening extend outwards and form two wing-like structures. Among the four panels, the front one has a board installed in the panel that can be opened and closed, whereas all others may have transom windows opened at their upper portions. The lid is integrally molded, with its size and shape determined by the base.

7 Claims, 7 Drawing Sheets

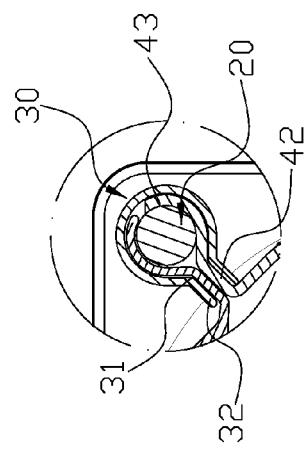
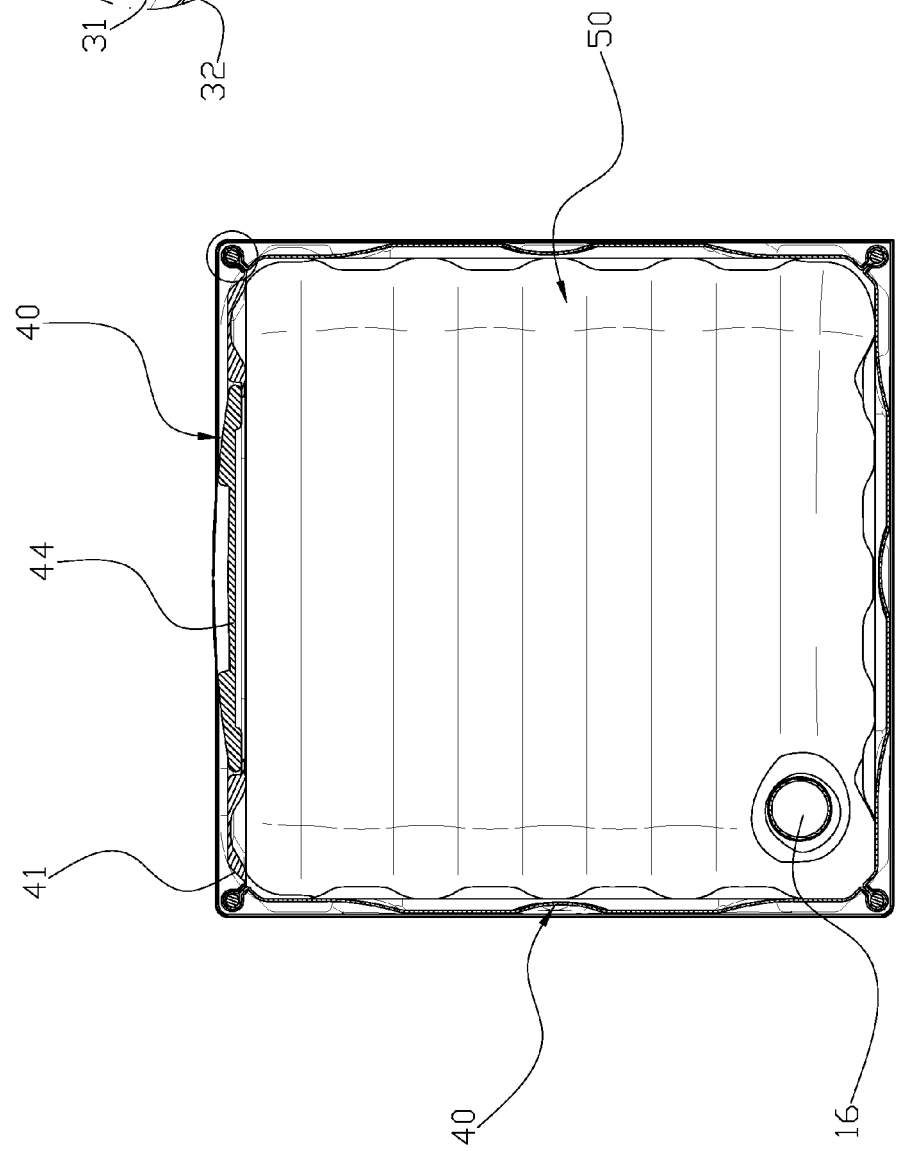
FIG. 4
FIG. 3

MOBILE TOILET STRUCTURE

FIELD OF INVENTION

The present invention relates to an improved mobile toilet structure, more particularly to a mobile toilet that can be placed outdoors or in an open area, to be used for compensating for the lack of or for completely replacing a fixed toilet.

BACKGROUND OF THE INVENTION

Mobile toilets are commonly required in remote areas, tourist attractions, large outdoor gatherings and construction sites, especially when fixed toilet facilities are not available or not adequate for the need. Currently known mobile toilets are generally constructed with a base, a plurality of panels, a number of L-shaped angle irons, and the panels and base that can be assembled by properly aligning the angel irons with the corresponding slots on the panels and applying the latch bolts for a secure connection.

However, the current mobile toilet structure as described above has some deficiencies in practical uses. First, because the assembly of the current structure requires latch bolts and angel irons, and the installation and removal of latch bolts are usually slow, the current mobile toilet structure does not allow convenient and rapid installation or uninstallation. Furthermore, moving an assembled mobile toilet of the current structure for a short distance would also be inconvenient because the installation or uninstallation cannot be readily accomplished, and the structure cannot be readily handled because all panels of the current structure are smooth surfaces without a device or place for grasping.

An example of the currently known mobile toilet structure is shown in FIG. 9 (U.S. Pat. No. 4,744,111). This mobile toilet structure comprises a base 70, four panels 71, four sleeve tubes 72, and a lid 73. The front portion of the base 70 is a stepping area 701, and the rear portion of the base 70 is an elevated working area 702. The two sides of the four panels bend outwardly and form extended wings 711. The extended wing 711 has a number of inclined guidance slots 712 and pin slots 713, which are the downward extension in vertical direction from the end of the inclined guidance slot 712. The panels 71 are assembled to the four sides of the base 70, by contacting the extended wings 711 of two adjacent panels 71. The sleeve tube 72 has an opening 721 on one side, and multiple through holes 722 on the two sides adjacent to the opening 721, wherein these through holes 722 allow positioning pins 722 to pass through. The opening 721 allows the interposition of the extended wings 711 of two adjacent panels 71, and the positioning pin 722 can then be moved down to the guidance slots 712 and locked into the pin slots 713, thereby achieving proper positioning of the four panels 71 through the connection with the sleeve tubes 72. The lid 73, with its size determined by that of base 70, is then placed on top of the four panels 71.

However, the abovementioned mobile toilet structure has problems in practical uses. This structure uses only sleeve tubes for connection and for structural support, which can only provide rather low structural stability; in addition, the limited range of locking by the pin slot 713 also leads to insufficient strength of connection.

Therefore, research and development for an improved mobile toilet structure to overcome the shortcomings of the current structure has been a goal for related industries. The present invention describes a further improved mobile toilet structure that solves previously mentioned problems of the current mobile toilet structure.

SUMMARY OF THE INVENTION

The present invention relates to a novel mobile toilet structure that provides desirable structural strength and allows convenient installation and uninstallation, which solves the abovementioned problems of current mobile toilet structure.

The present invention relates to an improved mobile toilet structure, which comprises: a base, four side bars, four sleeve tubes, four panels, and a lid. The front portion of the base is a stepping area with a flushing pedal installed, and the rear portion of the base is an elevated working area that holds the toilet. The base has four threaded holes, and each of the threaded holes is disposed at the four corners of the upper side of the base, and a vertical exhaust pipe at one side of the rear portion of the base. The side bar has a first threaded portion on its upper end and a second threaded portion on its lower end. The sleeve tube has a larger inner diameter than the outer diameter of the side bar, and has an opening along its entire length and at one side of the sleeve tube. Two margins of the opening extend outwards and form two wing-like structures, and the design of the opening provides elasticity to the sleeve tube and the wing-like structures increase the contacting area to enhance strength of connection. Each edge of the sides of the four panels has a recessed portion along the entire length of the panels, and the recessed portion extends externally with an expanding ramp and then an inwardly folded contacting area, which is in arc shape and acts to contact the outer surface of the side bar tightly. Among the four panels, the front one has a board that can be opened and closed, whereas all others may have transoms opened at their upper portion and these three panels all have conjugating lines at their top part. The lid is integrally molded, with its size and shape determined by the base, and each edge of the inner surface of the lid has a jointing trench. The lid has four through holes, and each of the through holes is disposed one of its four corners. A perforation is disposed corresponding to the exhaust pipe, and a trench is integrally formed at an inner surface of the base.

The improved mobile toilet structure of the present invention has significant advantages as following over conventional mobile toilets:

(i) The present invention provides an improved mobile toilet structure wherein the use of side bars, sleeve tubes, and the contacting areas of the panels allows the mobile toilet to be rapidly assembled, thereby reduces the time and effort required for installing of the mobile toilet.

(ii) The present invention provides an improved mobile toilets structure wherein the panels have recessed areas which can be utilized for moving the mobile toilet after it is installed, which saves time and effort for uninstallation and reinstallation, and it is thus convenient for practical use.

(iii) The present invention provides an improved mobile toilet structure wherein the positioning of adjacent panels is stabilized by both the side bars and the sleeve tubes to greatly increase the structural stability of the mobile toilet, and (iv) The present invention provides an improved mobile toilet structure wherein the sleeve tubes bundle with the panels along its entire length, such surface contact provides an increased strength of connection.

DESCRIPTION OF FIGURES

The following figures and diagrams illustrate the specific embodiments of the present invention, and for comparison one currently known mobile toilet structure:

FIG. 3 is a sectional view of the present invention.

FIG. 4 is an enlarged view of part of FIG. 3.

DETAILED DESCRIPTION OF THE INVENTION

Figure 1:
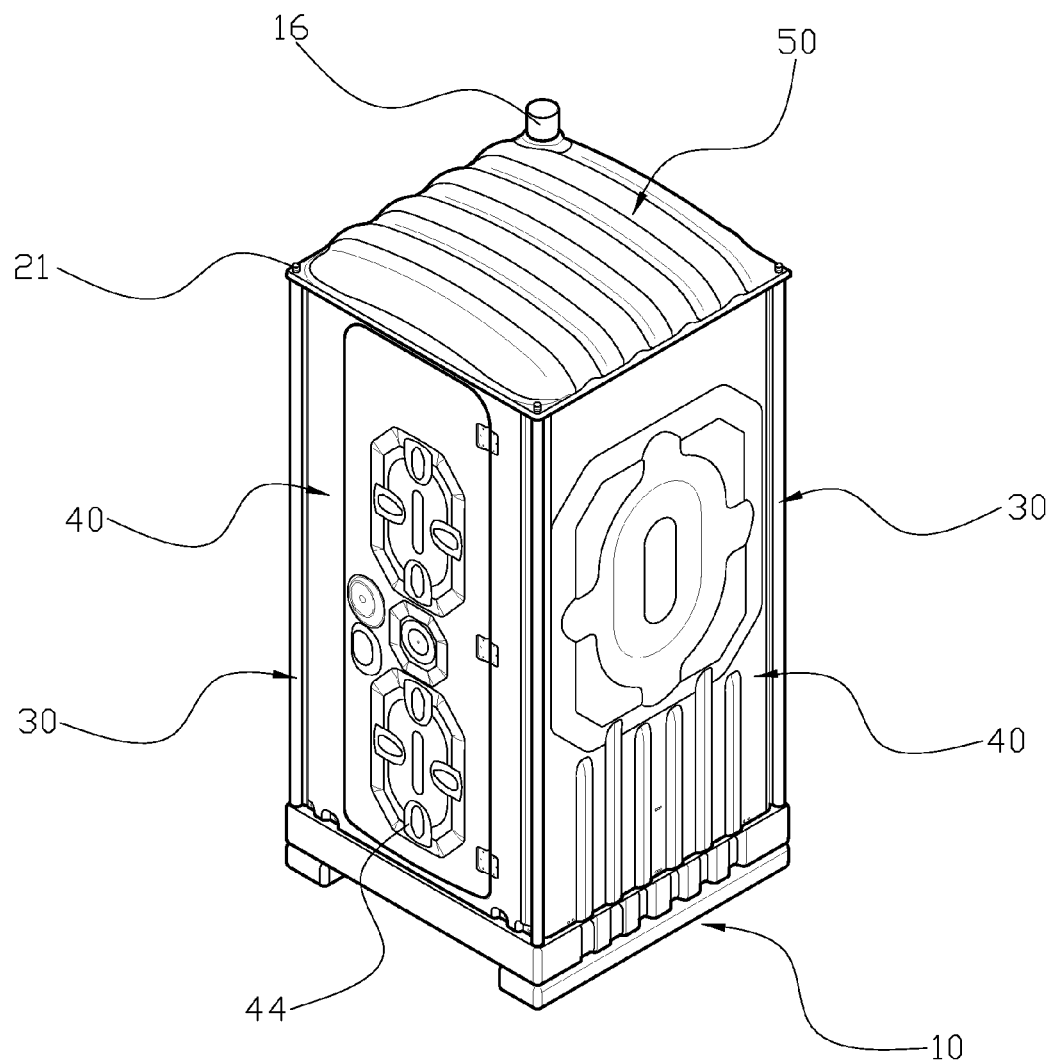
FIG. 1 is a perspective view of the present invention.
Figure 2:
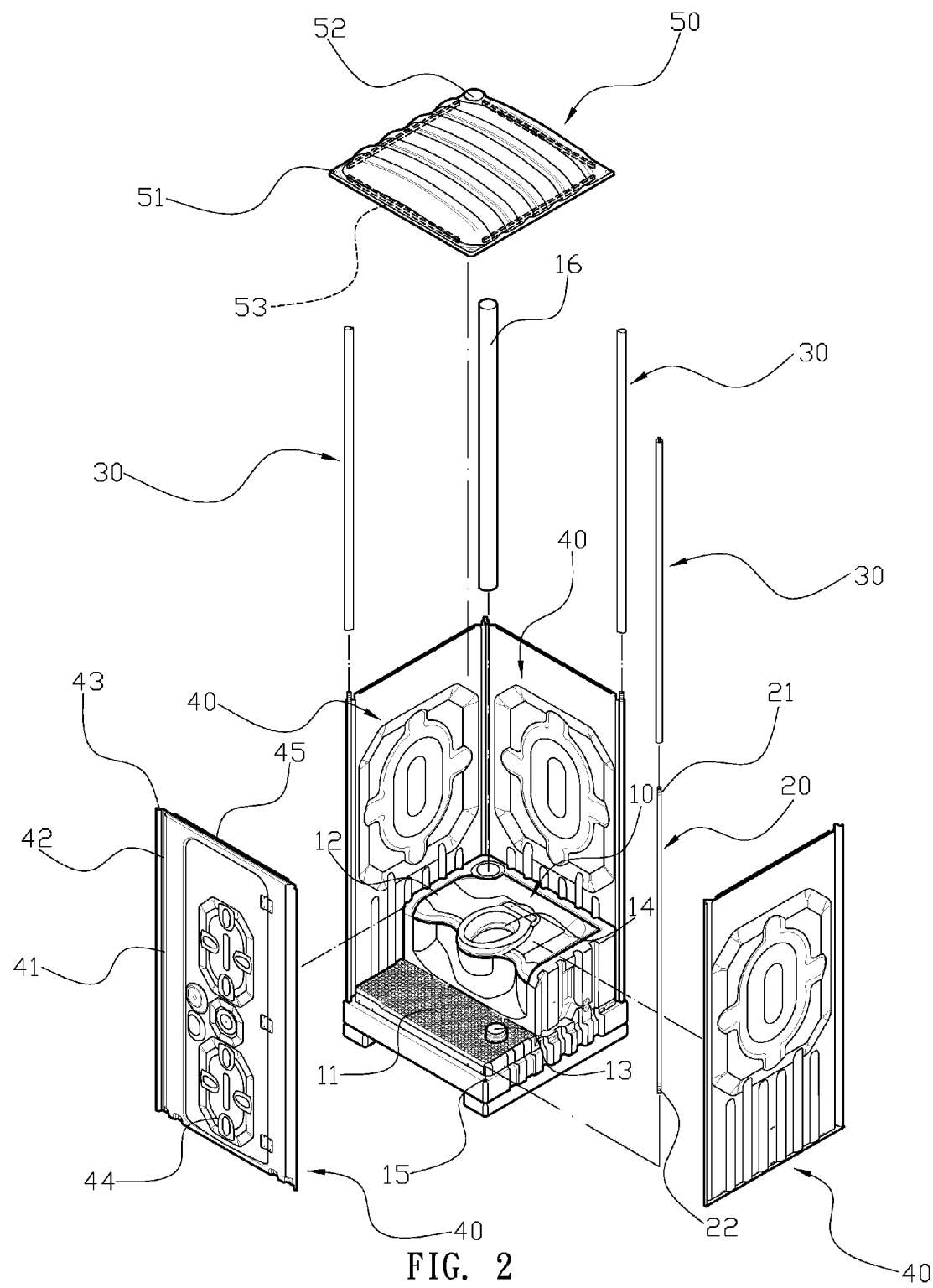
FIG. 2 is an exploded perspective view of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

An improved mobile toilet structure of the present invention is shown in FIGS. 1-4. The mobile toilet structure comprises a base 10, four side bars 20, four sleeve tubes 30, four panels 40, and a lid 50. The front portion of the base 10 has a stepping area 11, and the rear portion of the base 10 has an elevated working area 12, wherein the stepping area 11 has a flushing pedal 13 and the working area has a toilet 14. Each of the four corners of the base 10 has a threaded hole 15 opened at the upper side of the base 10, and the working area 12 has a vertical exhaust pipe 16 at one side of its rear portion. The side bar 20 has a first threaded portion 21 on its upper end and a second threaded portion 22 on its lower end. The sleeve tube 30 has a larger inner diameter than the outer diameter of the side bar 20, and has an opening 31 at one side of the sleeve tube 30 and the opening 31 extends along the entire length of the sleeve tube 30. Two margins of the opening 31 extend outwards and form two wing-like structures 32, and this design of the opening 31 provides elasticity to the sleeve tube 30 and the wing-like structures increases the contacting area to enhance the strength of connection. Each edge of both sides of the four panels 40 has a recessed portion 41 along the entire length of the panels, and the recessed portion 41 is continued laterally with an externally expanding ramp 42 and then a inwardly folded contacting area 43, which is in arc shape and acts to contact the outer surface of the side bar 20 tightly. Among the four panels, the front panel 40 has an operable board 44 that can be opened or closed, whereas all others may have transoms opened at their upper portion (not shown in the FIGs) and all these panels all have conjugating lines 45 at their top part. The lid 50 is integrally molded, with its size and shape determined by the base 10, and each edge of the inner surface of the lid 50 has a jointing trench 53. The lid 53 has four through holes 51, each of which us disposed at the four corners of the lid 50, and a perforation 52 is formed corresponding to the exhaust pipe 16, and the conjugating lines 45 engage with the joining trench 53 to increase the conjugating strength.

The assembly of the mobile toilet in the present invention is illustrated in FIGS. 1, 3, and 4. The side bar 20 is secured to the base 10 by inserting the second threaded section 22 of side bar 20 into the screw hole 15 of the base 10, which allows it to stand vertically on the base 10. Each of the panels 40 is then placed at the four sides of the base 10, with its inwardly folded contacting area 43 to contact the outer periphery of the side bar 20 tightly for structural support. The sleeve tube 30 is then placed to completely enclose the outer periphery of the inwardly folded contacting edge 43 of the two adjacent panels 40 with its opening 31, and the wing-like structures 32 to reside tightly against the inclined ramp 42 due to the elasticity generated by the wing-like structural design, these together allowing the panels 40 to bundle with the side bar 20 to achieve stable positioning of the panels. The lid 50 can then be disposed on the top of the panels by passing the first threaded sections 21 of the side bars 20 through the through holes 51 and the exhaust pipe 16 through the perforation 52, respectively, and by engaging the conjugating lines 45 of panel 40 with the jointing trenches 53 of the lid 50, the connection strength is enhanced and the installation is thus completed.

Figure 5:
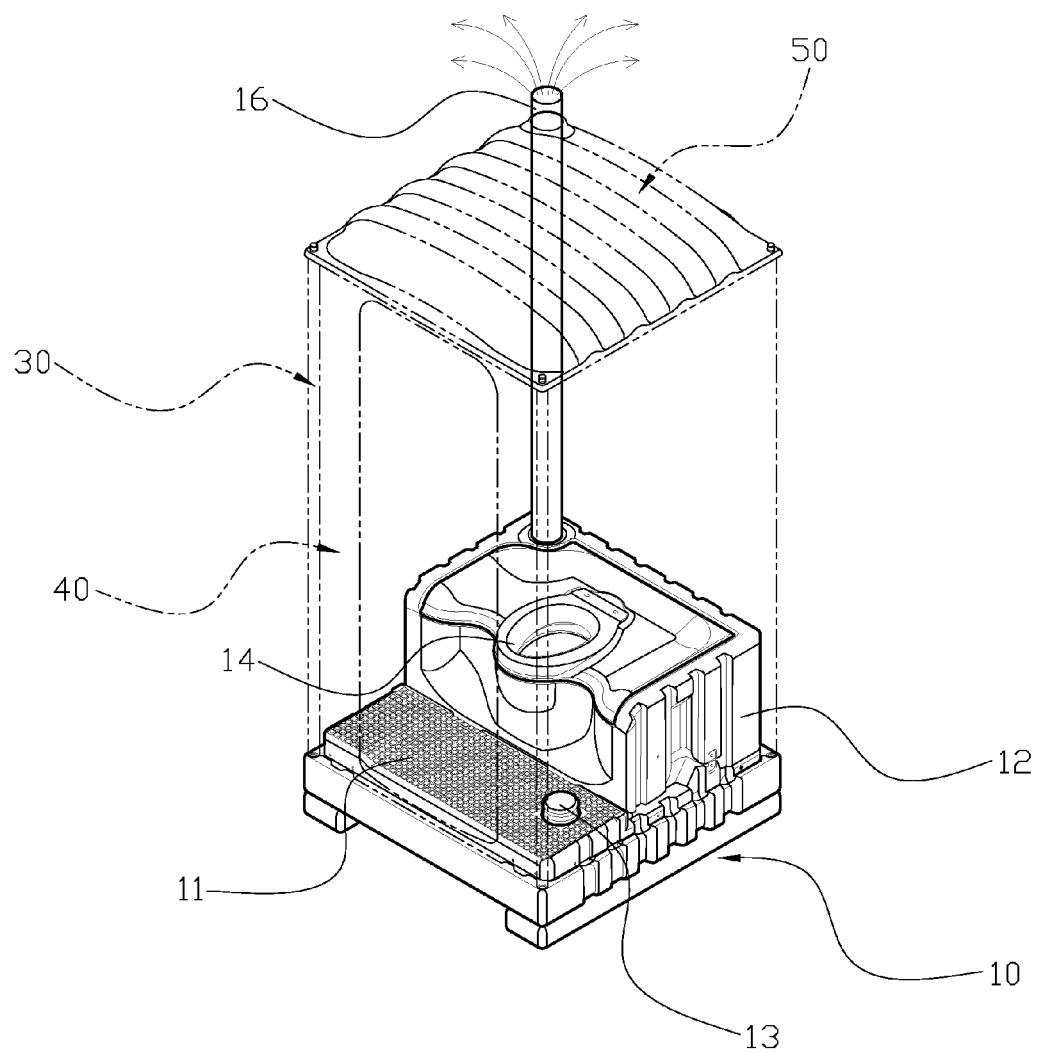
FIG. 5 is a diagram showing the emission of noxious gas from the present invention.
Figures 6, 7:
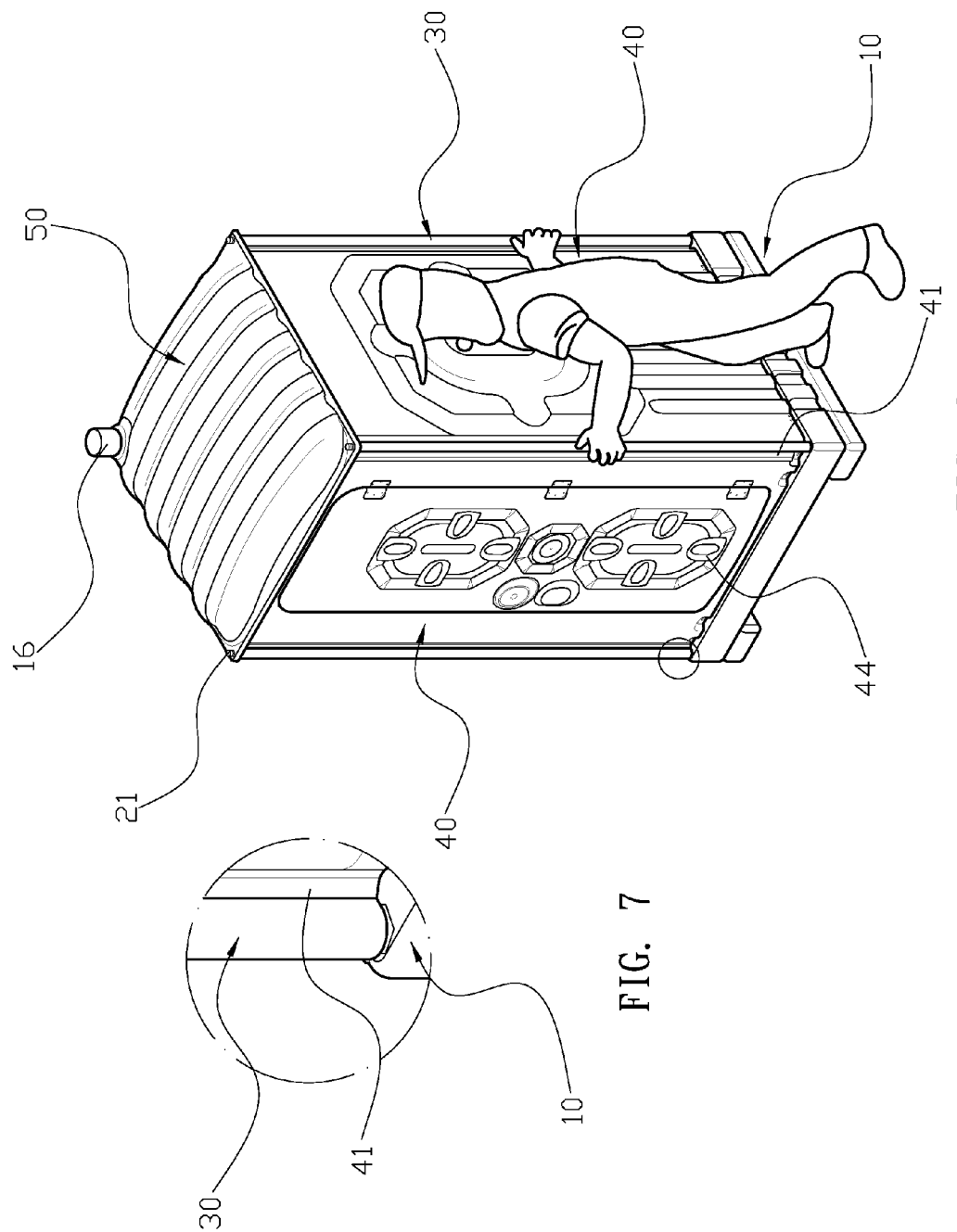
FIG. 6 is a diagram showing that toilet in the present invention is being moved.
FIG. 7 is an enlarged view of part of FIG. 6.
Figure 8:
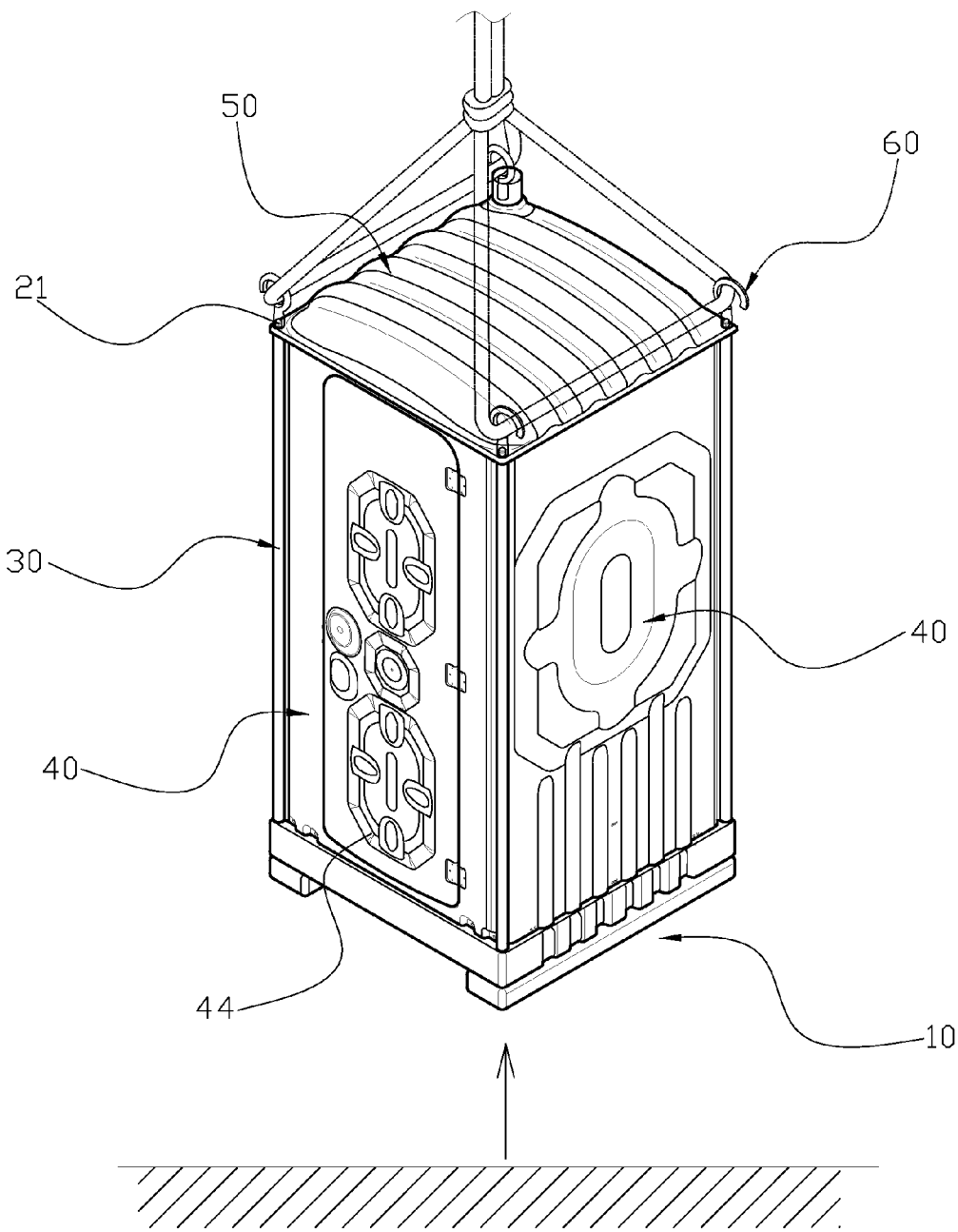
FIG. 8 is a diagram showing the toilet present invention is hung and moved.
Figure 9:
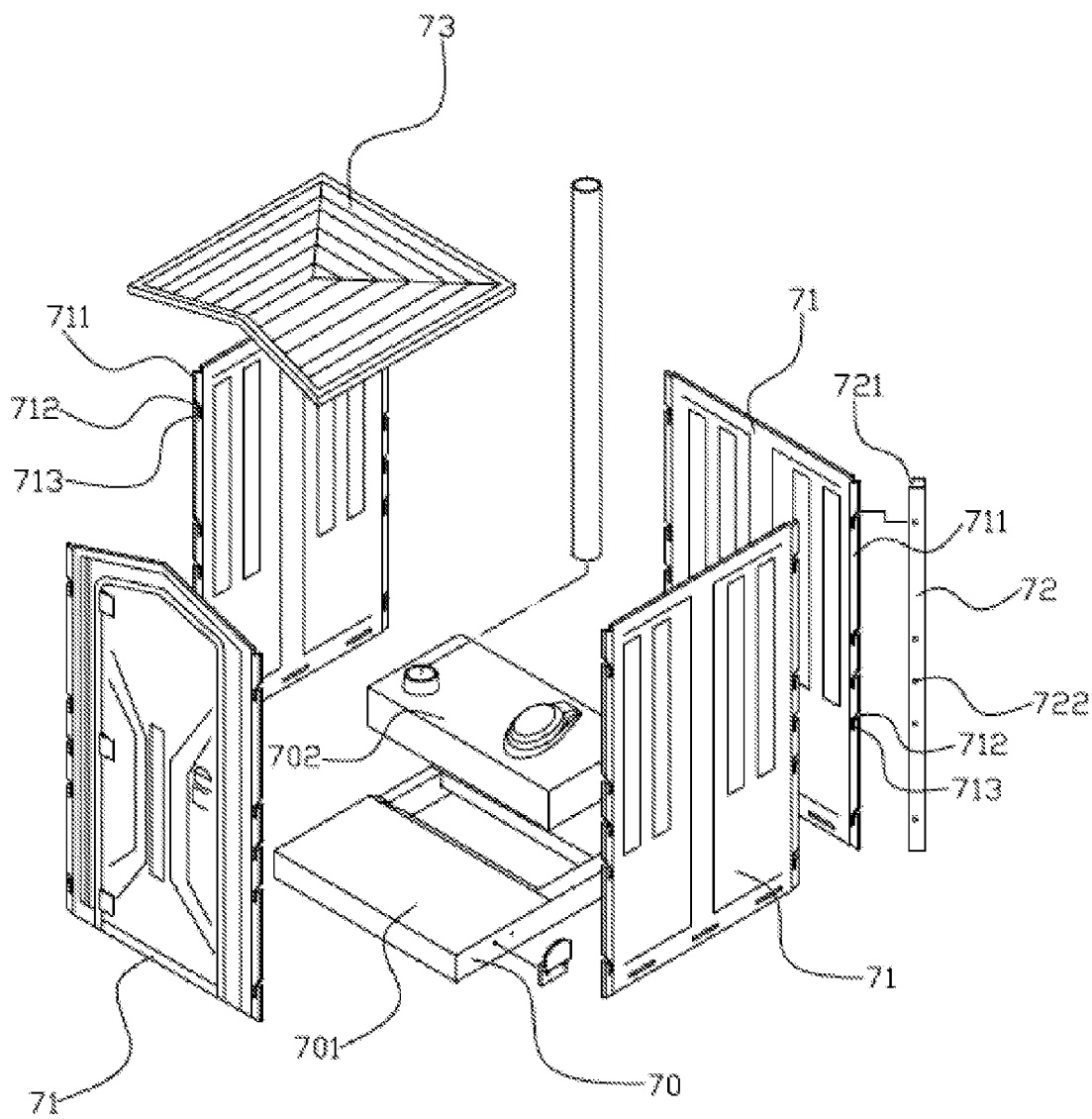
FIG. 9 is a perspective exploded view of the conventional mobile toilet structure.

The mobile toilet described in the present invention can be set up conveniently in an open area or outdoors for compensating for the lack of or for completely replacing fixed toilets. In practical use, the exhaust pipe 16 is used to discharge the noxious gas inside the container of the mobile toilet, especially when the mobile toilet is heavily used and/or is placed in a high-temperature environment (shown in FIG. 5). If the mobile toilet in the present invention needs to be moved for a short distance after its installation, this can be achieved by hand grasping the recessed portion 41, which allows the mobile toilet to be conveniently handled (shown in FIGS. 6 and 7). The mobile toilet in the present invention can also be hung moved by the hooks connected to the first threaded sections 21 of the side bars 20 that protrude outside of the lid 50 (shown in FIG. 8). Thus, it is convenient and flexible for the user to position and adjust the mobile toilet after its installation.

The embodiments of the present invention as described above provide the following advantages over current mobile toilet structures. First, the use of side bars 20, sleeve tubes 30 and the contacting areas 43 of the panels allows the mobile toilet to be rapidly assembled, thereby reduces the time and effort required for installation of the mobile toilet.

Secondly, the recessed areas 41 of the panels 40 can be utilized for moving the mobile toilet after it is installed. This saves time and effort for uninstallation and reinstallation in practical uses. In addition, the positioning of adjacent panels 40 is stabilized by both the side bars 20 and the sleeve tubes 30, which greatly increases the structural stability of the mobile toilet. Finally, the sleeve tubes 30 bundle with the panels 40 along its entire length, and such surface contact provides an increased strength of connection over currently known mobile toilet structure.

To summarize, the present invention describes a mobile toilet structure with a breakthrough in structural design, further improved new components, and advantages in practical use and commercial exploration. The present invention has not been disclosed in any published materials and thus possesses novelty.

The above description and illustrations are for one exemplary embodiment of the present invention and should not be considered to limit the scope of the implementation of the present invention. Accordingly, the present invention is not to be considered as limited by the forgoing description, but includes any equivalents.

What is claimed is:

1. An improved mobile toilet structure, comprising: a base, four side bars, four sleeve tubes, four panels and a lid,
   wherein the base has four threaded holes located at four corners of an upper portion of the base; the side bar has a first threaded portion on its upper end and a second threaded portion on its lower end; and the sleeve tube has an opening on one side and two margins of the opening extend outwards and form two wing-like structures;
   wherein each edge of both sides of the four panels all have a recessed portion along the entire length of the panels, and the recessed portion is continued with an externally expanding ramp and then an inwardly folded contacting area; and the lid is integrally molded, with its size and shape determined by the base, and each edge of the inner surface of the lid has a jointing trench;
   wherein the side bar is secured to the base by inserting the second threaded section of the side bar into the screw hole of the base, which allows the side bar to stand vertically on the base, and the panels are then placed at the four sides of the base, with their inwardly folded contacting areas to contact the periphery of the side bars tightly for structural support, and the sleeve tube completely encloses the outer periphery of the inwardly folded contacting areas of the two adjacent panels with the wing-like structures of its opening, allowing the panel to bundle with the side bars for stable positioning; and
   wherein the lid is placed on the top of the panels by passing the first threaded sections of the side bars through the through holes and the exhaust pipe through the perforation, respectively, and by engaging a conjugating line of the panel with the jointing trench of the lid.

2. The improved mobile toilet of claim 1, wherein said front portion of the base is a stepping area, and said rear portion of the base is an elevated working area.

3. The improved mobile toilet of claim 2, wherein said stepping area has a flushing pedal and said working area has a toilet.

4. The improved mobile toilet of claim 1, wherein said base has a vertical exhaust pipe and the lid has a perforation aligned with the exhaust pipe, and the exhaust pipe protrudes out from the perforation of the lid when the lid is placed on the top of the panels.

5. The improved mobile toilet of claim 1, wherein the front panel has an operable board that is able to be opened and closed.

6. The improved mobile toilet of claim 1, wherein three panels, excepting the front panel, have transoms windows opened at upper portions of the panels.

7. The improved mobile toilet of claim 1, wherein the first threaded section of the side bar that protrudes outside of the lid and is connected to a screw hook.

* * * * *